United States Patent
Olle et al.

(10) Patent No.: US 6,885,903 B2
(45) Date of Patent: Apr. 26, 2005

(54) METHOD AND SYSTEM FOR TRACKING REPAIR OF COMPONENTS

(75) Inventors: Michael S. Olle, Kennesaw, GA (US); John Bottoms, Huntersville, NC (US); Todd A. Godwin, Kennesaw, GA (US); Andrew L. Jackson, Jr., Powder Springs, GA (US); Mark D. Schlegel, Huntersville, NC (US); Rishi Gulati, Marietta, GA (US); Christopher A. Ware, Marietta, GA (US)

(73) Assignee: General Electric Company, Schenectady, NY (US)

( * ) Notice: Subject to any disclaimer, the term of this patent is extended or adjusted under 35 U.S.C. 154(b) by 470 days.

(21) Appl. No.: 09/903,373

(22) Filed: Jul. 10, 2001

(65) Prior Publication Data

US 2003/0014142 A1 Jan. 16, 2003

(51) Int. Cl.[7] .............................................. G06F 19/00
(52) U.S. Cl. ............................ 700/108; 700/105; 705/9
(58) Field of Search ................................. 700/110, 109, 700/105, 108, 99, 97, 111; 701/29, 35; 702/183, 185, 184; 705/1, 4, 9, 15, 29

(56) References Cited

U.S. PATENT DOCUMENTS

| 6,263,322 | B1 |   | 7/2001 | Kirkevold et al. |
| 6,345,257 | B1 | * | 2/2002 | Jarrett ........................... 705/1 |
| 2002/0007225 | A1 |   | 1/2002 | Costello et al. |
| 2002/0007289 | A1 | * | 1/2002 | Malin et al. ................... 705/4 |

* cited by examiner

*Primary Examiner*—Leo Picard
*Assistant Examiner*—Steven R. Garland
(74) *Attorney, Agent, or Firm*—Nixon & Vanderhye P.C.

(57) ABSTRACT

A computer-based method and system for tracking repairs of different types of components. The repair tracking system receives repair orders identifying components of customers that need repair. After a repair order is received, an engineer uses the repair tracking system to assign a repair plan to the repair order. When a repair technician receives a component or subcomponent of a repair order, the repair technician uses the repair tracking system to identify the steps that need to be performed next. After the repair of the component is complete, the repair technician uses the repair tracking system to indicate the completion and to determine where to send the component so that the next step in the repair plan can be performed.

36 Claims, 21 Drawing Sheets

Fig. 15

METHOD AND SYSTEM FOR TRACKING REPAIR OF COMPONENTS

BACKGROUND

The described technology relates to computer systems for tracking the repair of components.

Many large companies sell an extensive line of products throughout the world. Because these products may be very expensive, these companies may have repair facilities for maintaining and repairing the products rather than simply replacing the products. For example, one company may have over 70 repair facilities located throughout the world to service customers near the repair facility. When the products are large (e.g., an electric motor), a nearby repair facility can significantly reduce the shipping time and shipping costs associated with the repair of a product and its components. Reduced shipping time is especially important when the customer loses significant revenue while a product is down. For example, if a steam turbine of a utility company is down as a result of a failure of one of its components, the utility company can lose significant revenue as a result of its inability to use that steam turbine to generate electricity.

A typical repair facility manually tracks components to be repaired. When a component is received from a customer, a repair technician may diagnose the problem and pass the component along to another repair technician who may be responsible for disassembling the component into its subcomponents. The repair technician may then send each of the subcomponents to other repair technicians who are responsible for inspecting and repairing the subcomponents. When the subcomponents are eventually inspected and repaired, then a repair technician may reassemble the component and ship the component back to the customer. If the customer wants to know the status of the repair of their component, then a repair technician may need to manually track down each repair technician who is currently inspecting and repairing a subcomponent and ask for a status update. That repair technician then compiles the status update information and provides a status report to the customer. It can be both time-consuming and costly to manually track down the status of a component being repaired. Moreover, customers may be frustrated by the delay in responding to their status requests.

A problem with so many repair facilities is the lack of uniformity in the repair process. Each repair technician may perform different inspections on the same type of component and use different techniques for repairing the same type of component. This lack of uniformity in the repair process may result in subcomponents that are inadequately repaired or that are over repaired (e.g., unnecessarily replaced parts). This lack of uniformity has several disadvantages. First, a customer may be surprised to learn that the same type of repair can cost more or less depending on the repair technician and the repair facility. Second, an inadequately repaired subcomponent may have additional costly breakdowns. Third, it is expensive to over repair subcomponents. Fourth, the company may provide service contracts to its customers, and the repair of a component may be an opportunity to maintain certain subcomponents whose maintenance is not necessary for the repair but is necessary to prevent a breakdown in the near future.

It would be desirable to have a computer system that would allow both for the tracking of the repair of the components and for uniformity in the repair of such components. In particular, it would be desirable to provide uniform plans for repairing components of the same type, to track which repair technicians are currently repairing which subcomponents and the status of such repair, and to provide customers with timely status information on the repair of their components.

BRIEF DESCRIPTION OF THE DRAWINGS

FIG. 2 illustrates a display page for receiving a repair order in one embodiment.

FIG. 14 illustrates a display page for recording the results of processing a step of a repair order in one embodiment.

FIG. 15 illustrates a display page for an inspection form in one embodiment.

DETAILED DESCRIPTION

A computer-based method and system for tracking repairs of different types of components is provided. In one embodiment, the repair tracking system receives repair orders identifying components of customers that need the repair. In the following, the term "repair" refers to any servicing of a component and its subcomponents including repairing of and performing preventive maintenance on components. After a repair order is received, an engineer uses the repair tracking system to assign a repair plan to the repair order. The repair plan outlines the various steps that are to be used to repair the component and its subcomponents. For example, one step may indicate to inspect a certain subcomponent and to replace any parts that are not within tolerance. Another step may indicate the needed skill of the repair technician. When a repair technician receives a component or subcomponent of a repair order, the repair technician uses the repair tracking system to identify the steps that need to be performed next. The repair technician may identify the repair order by the serial number of the component or subcomponent to be serviced or by the repair order identifier (e.g., job number). The repair tracking system may provide inspection forms through which the repair technician can record the results of inspecting the component and may provide method sheets that detail how a repair is to be made. After the repair of the component is complete, the repair technician uses the repair tracking system to indicate the completion and to determine where to send the component so that the next step in the repair plan can be performed.

The repair tracking system may provide standard repair plans for different types of components and different types of repairs. The engineer who assigns a repair plan to a repair order may customize the repair plan to address the problems noted by the customer. Nevertheless, the use of standard repair plans helps to ensure uniformity in the repairing of components throughout the various repair facilities of a company and helps to minimize the under and over repair problems. Since each repair technician records the current status of the repair of each component, the repair tracking system can provide customers with timely access to up-to-date status information for their repair orders. In addition, the repair tracking system provides information that can be used by engineers to design new components or redesign existing components based on the repair experience of various components.

Figure 1:
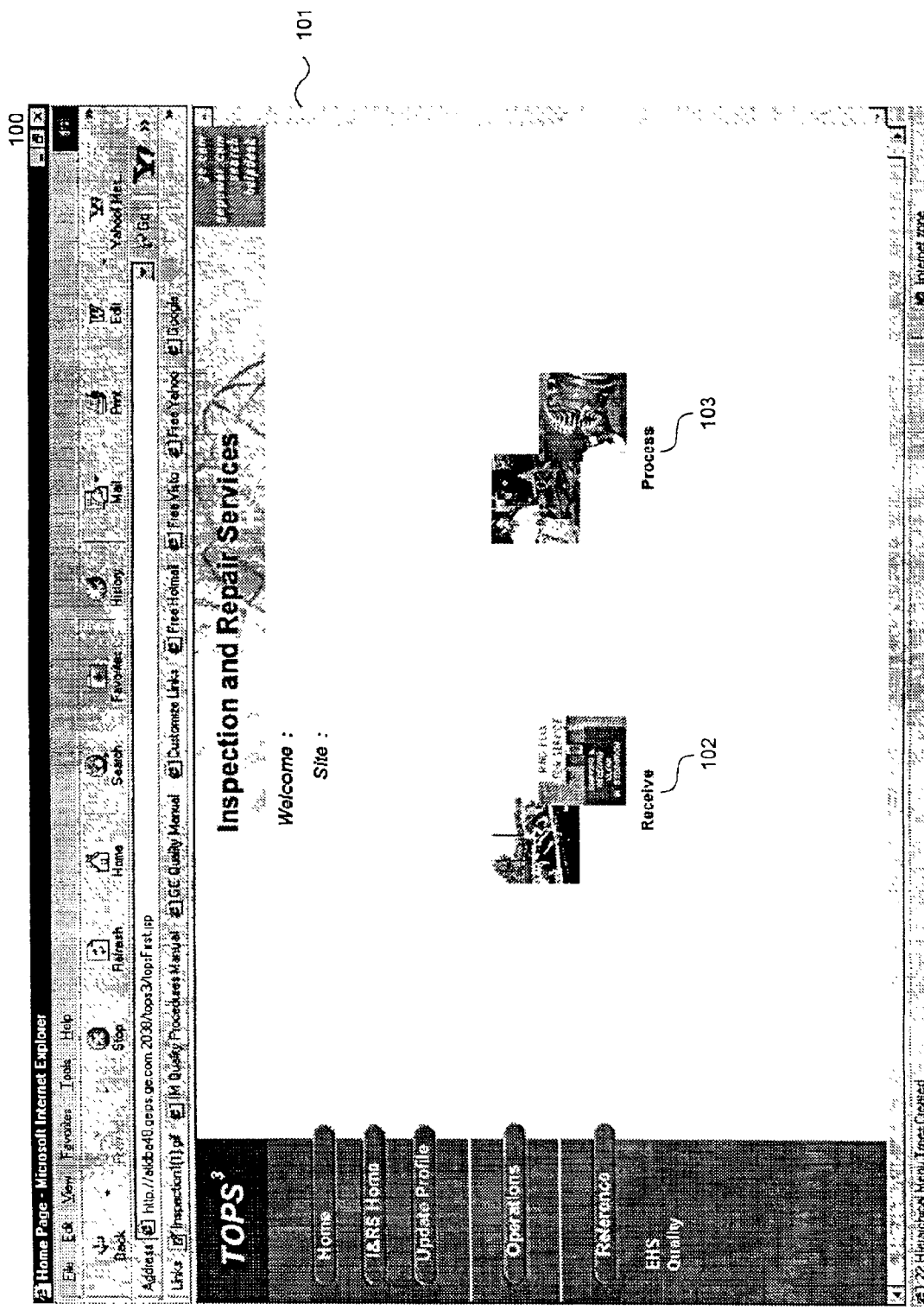
FIG. 1 illustrates a display page for receiving and processing repair orders in one embodiment.

FIGS. 1–15 illustrate display pages of a repair tracking system in one embodiment. FIG. 1 illustrates a display page for receiving and processing repair orders in one embodiment. The display page 100 includes selection area 101 with a receive icon 102 and a process icon 103. The receive icon is used to record information relating to a repair order that is received from a customer. The information may include the serial numbers of the component and subcomponents to be repaired, the name of the customer, and a description of the problem with the component or of the needed servicing. The process icon is used by the repair technicians to retrieve information describing the next step that needs to be performed in the repair process and to record the status of the repair process.

Figure 2:
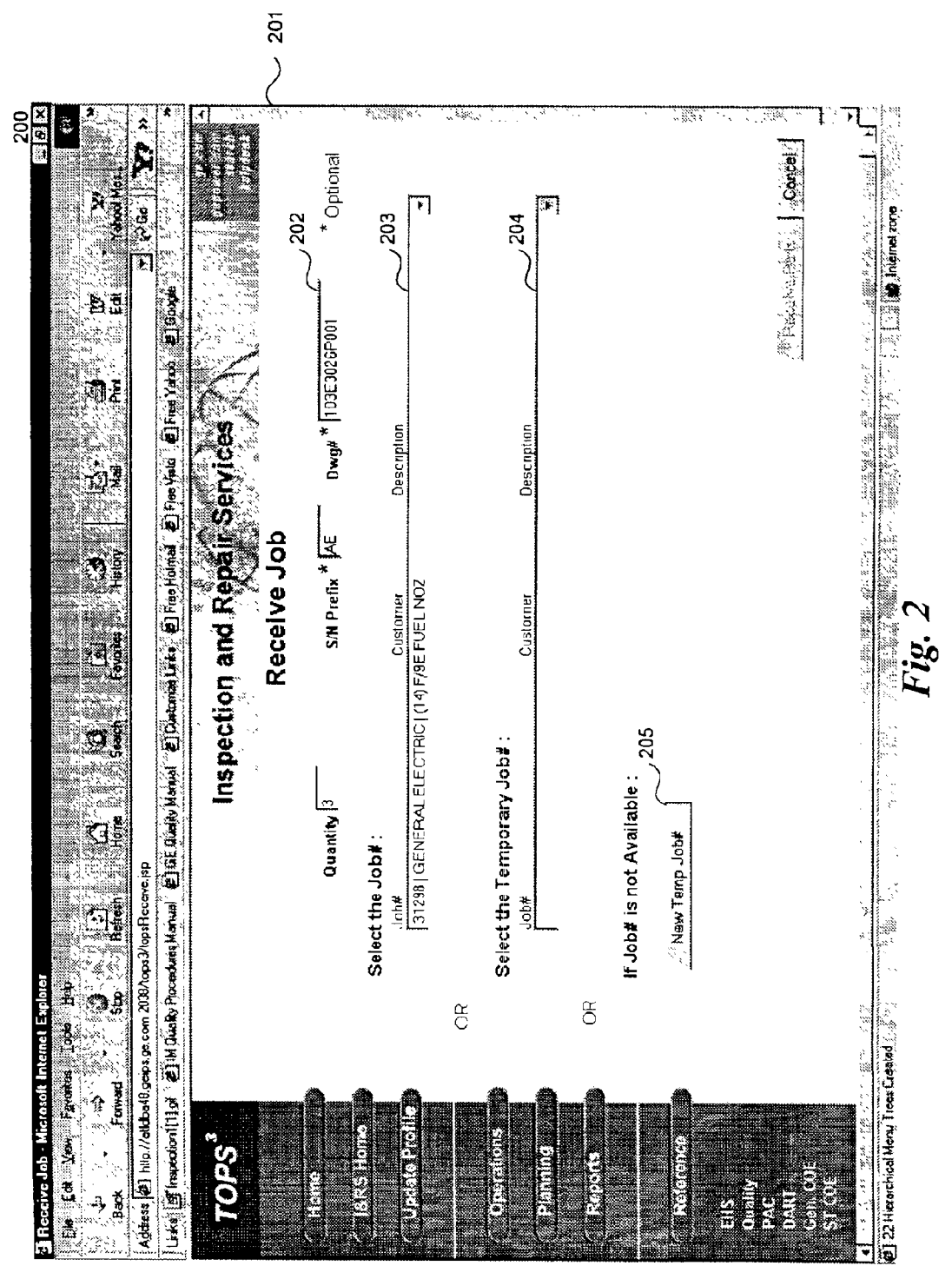

FIG. 2 illustrates a display page for receiving a repair order in one embodiment. The display page 200 includes the entry area 201 that includes a repair order information area 202, an existing repair order selection area 203, a temporary repair order selection area 204, and a new temporary repair order button 205. If a new repair is to be created, the user enters the quantity of components to be repaired (e.g., two electric motors of a certain type) and, if known, the serial number prefix and drawing number for the component to be repaired. The user then selects the new temporary repair order button to assign a new repair order identifier to the new repair order. If the user wants to view an existing repair order, the user selects an existing repair order or temporary repair order using the existing repair order selection area or temporary repair order selection area. Once a repair order is created, it becomes a temporary repair order until it is saved permanently. The repair tracking system may store information describing temporary repair orders in files of the user's local computer. When a temporary repair order is made permanent, then the repair tracking system stores the repair order information in a database of the repair tracking system. The use of temporary repair orders allows the user to create and modify a repair order locally before it is submitted to an engineer for assignment of a repair plan.

Figure 3:
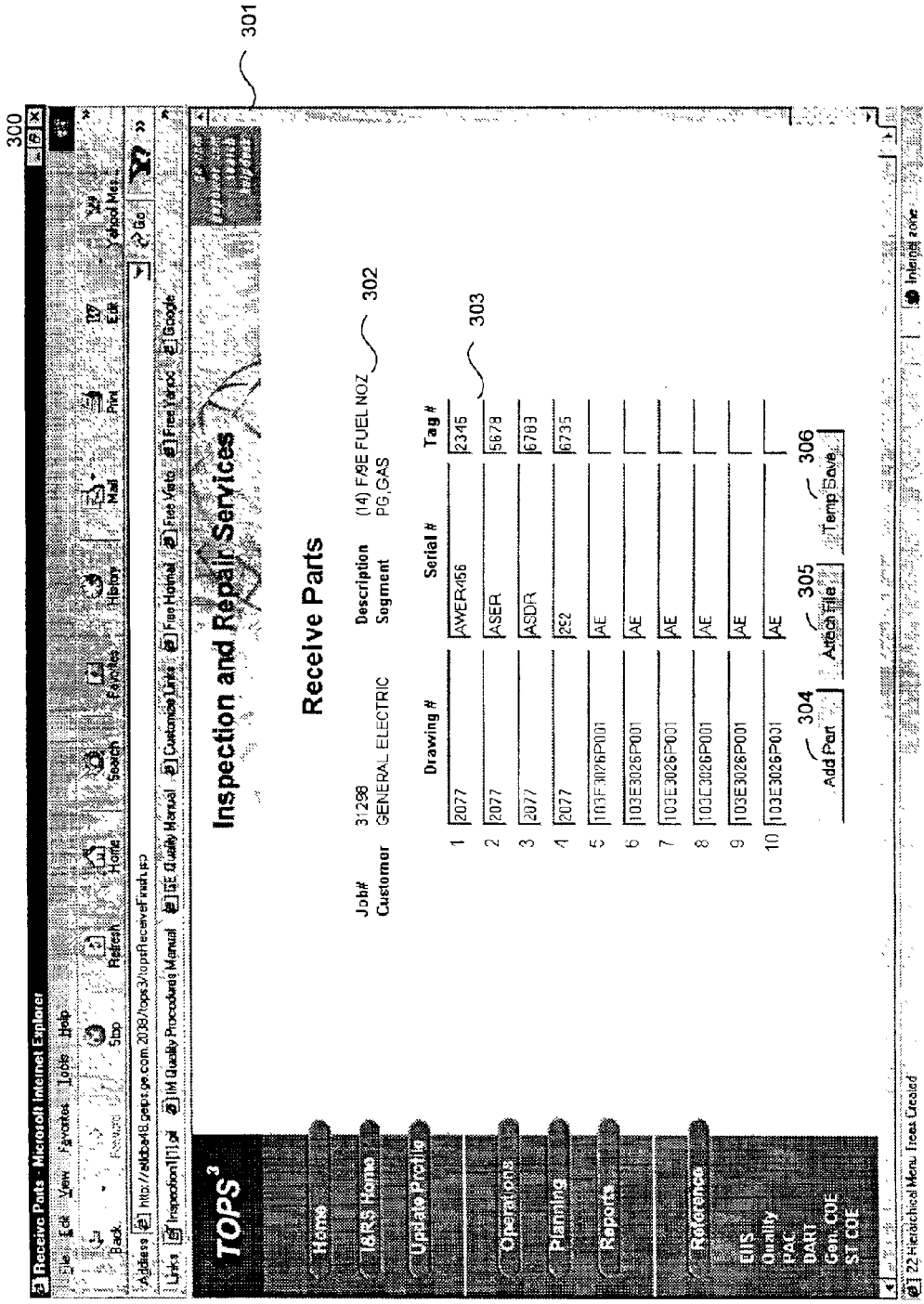
FIG. 3 illustrates a display page for recording components and subcomponents of a repair order in one embodiment.

FIG. 3 illustrates a display page for recording components and subcomponents of a repair order in one embodiment. The display page 300 includes a data entry area 301. The data entry area includes a repair order identification area 302, a subcomponent data entry area 303, an add part button 304, an attach file button 305, and a temporary save button 306. The repair order identification area contains information describing the repair order. This information may be entered through a display page (not shown) for providing general repair order information. The subcomponent data entry area includes a drawing number, a serial number, and a tag number field for each subcomponent of the repair order. The user enters the information in the subcomponent data entry area and selects the add part button to add the listed subcomponents to the repair order. The user selects the attach file button to attach additional information relating to the repair order. For example, the attached file may include a description provided by the customer indicating the problem with the component to be repaired. The user selects the temporary save button to temporarily save the repair order prior to being permanently saved for further processing by the repair tracking system. If the selected repair order had already been temporarily saved, then button 306 may indicate to permanently save the repair order.

Figure 4:
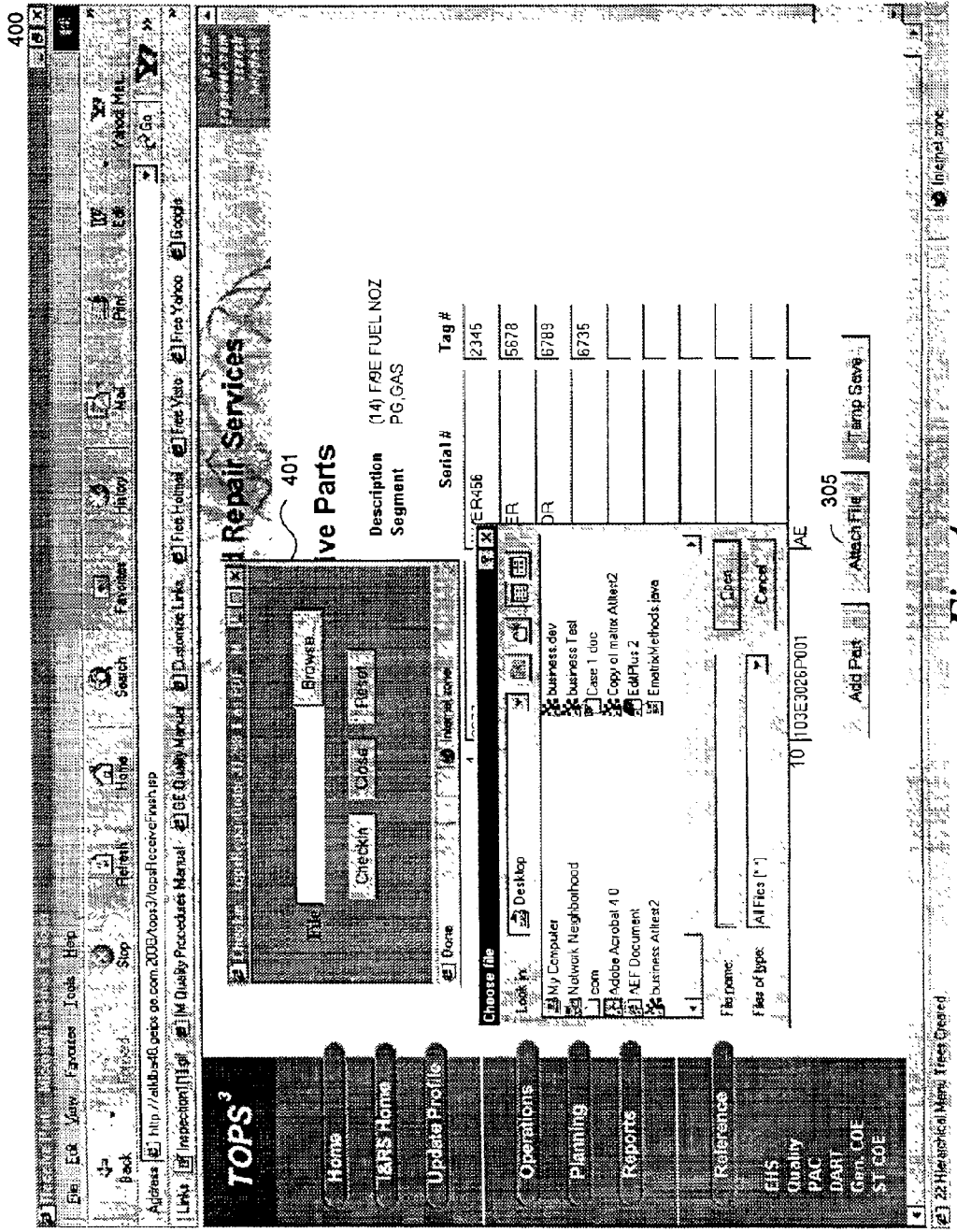
FIG. 4 illustrates a display page for attaching a file to a repair order in one embodiment.

FIG. 4 illustrates a display page for attaching a file to a repair order in one embodiment. The display page 400 includes a dialog box 401 through which a user enters the name of the file to be attached to the repair order. The file may be locally stored at the user's computer. The dialog box is displayed when the user selects the attach file button 305. The repair tracking system may create a copy of the attached file when the repair order is made permanent and store that copy in a repair order database. One skilled in the art will appreciate that multiple files can be attached to a repair order.

Figure 5:
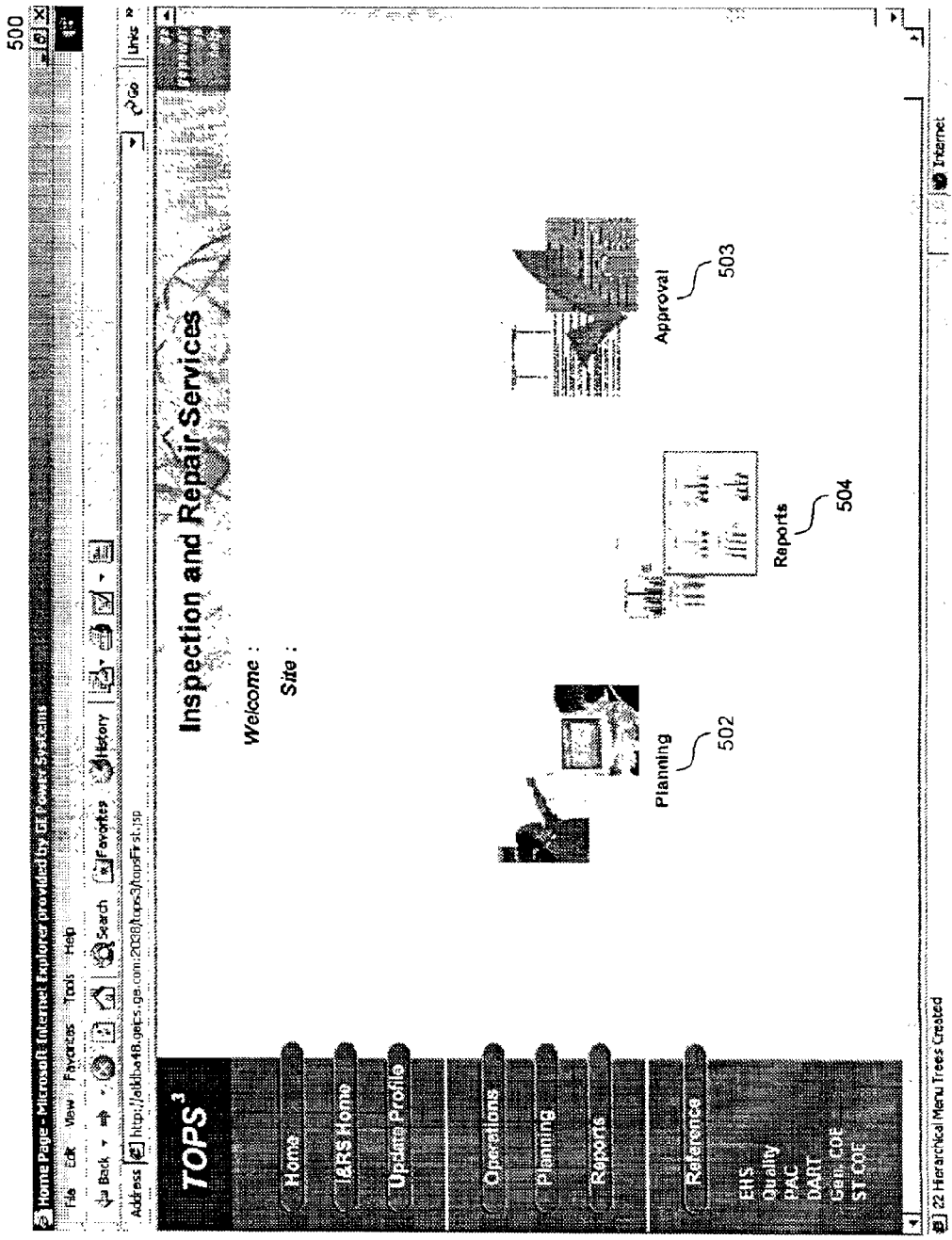
FIG. 5 illustrates a display page for planning, approving, and reporting repair orders in one embodiment.

FIG. 5 illustrates a display page for planning, approving, and reporting repair orders in one embodiment. The display page 500 includes a planning icon 502, an approval icon 503, and a reports icon 504. A user selects the planning icon to invoke a planning module that allows the user to assign a repair plan to a repair order. A user selects the approval icon to invoke an approval module that allows a user to approve the repair plan that has been assigned to a repair order. The user selects the reports icon to access various reports provided by the repair tracking system. The repair tracking system may require users to log onto the repair tracking system. The repair tracking system may store a user name and password for each user along with the capabilities associated with that user. The capabilities may include receive orders, process orders, plan orders, or approve orders. A user may have any combination of these capabilities. For example, a repair technician may only have the capability to process orders, whereas the manager of the repair facility may have all the capabilities.

Figure 6:
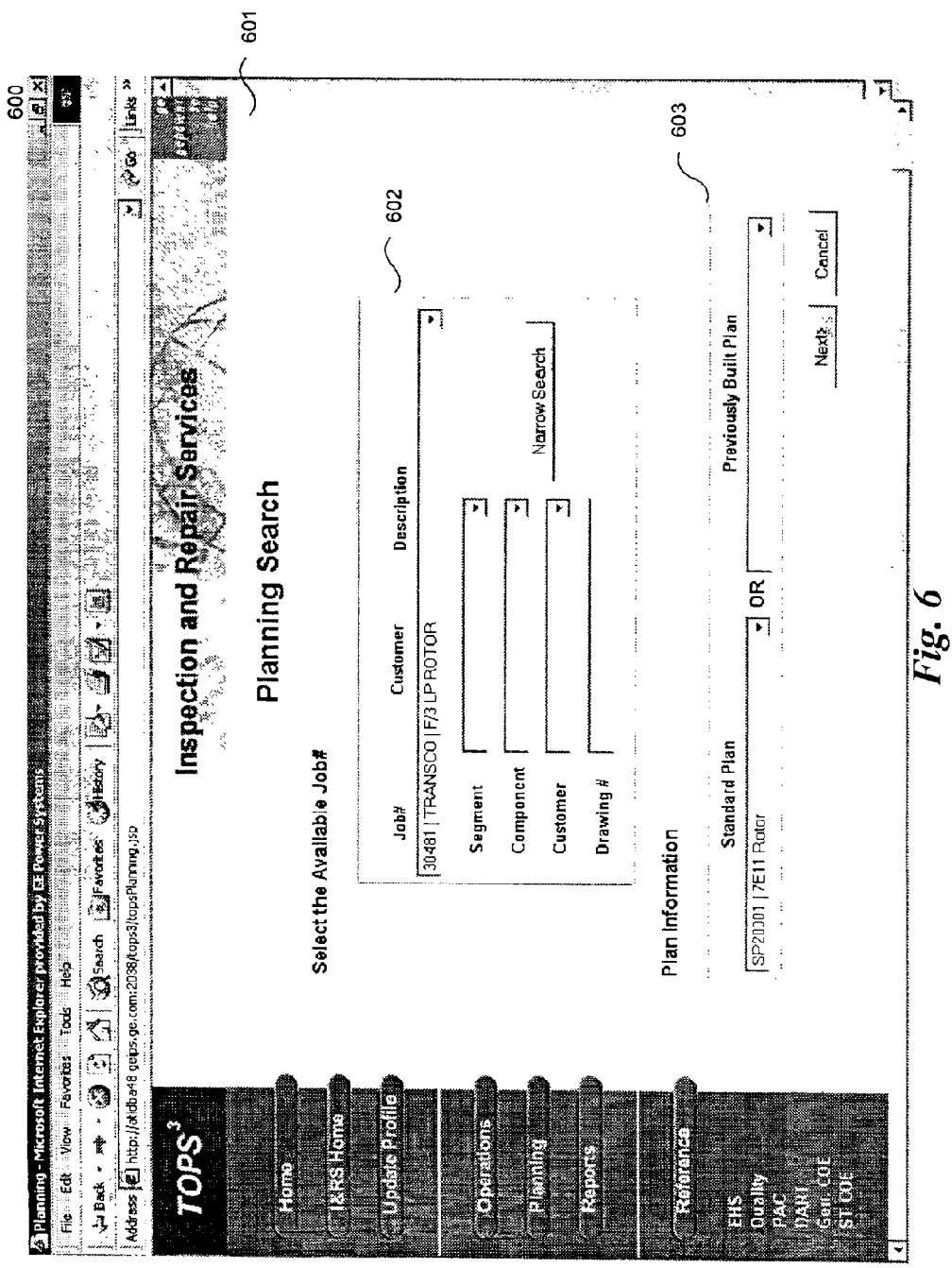
FIG. 6 illustrates a display page for selecting a repair order that is to be assigned a repair plan in one embodiment.
Figure 7:
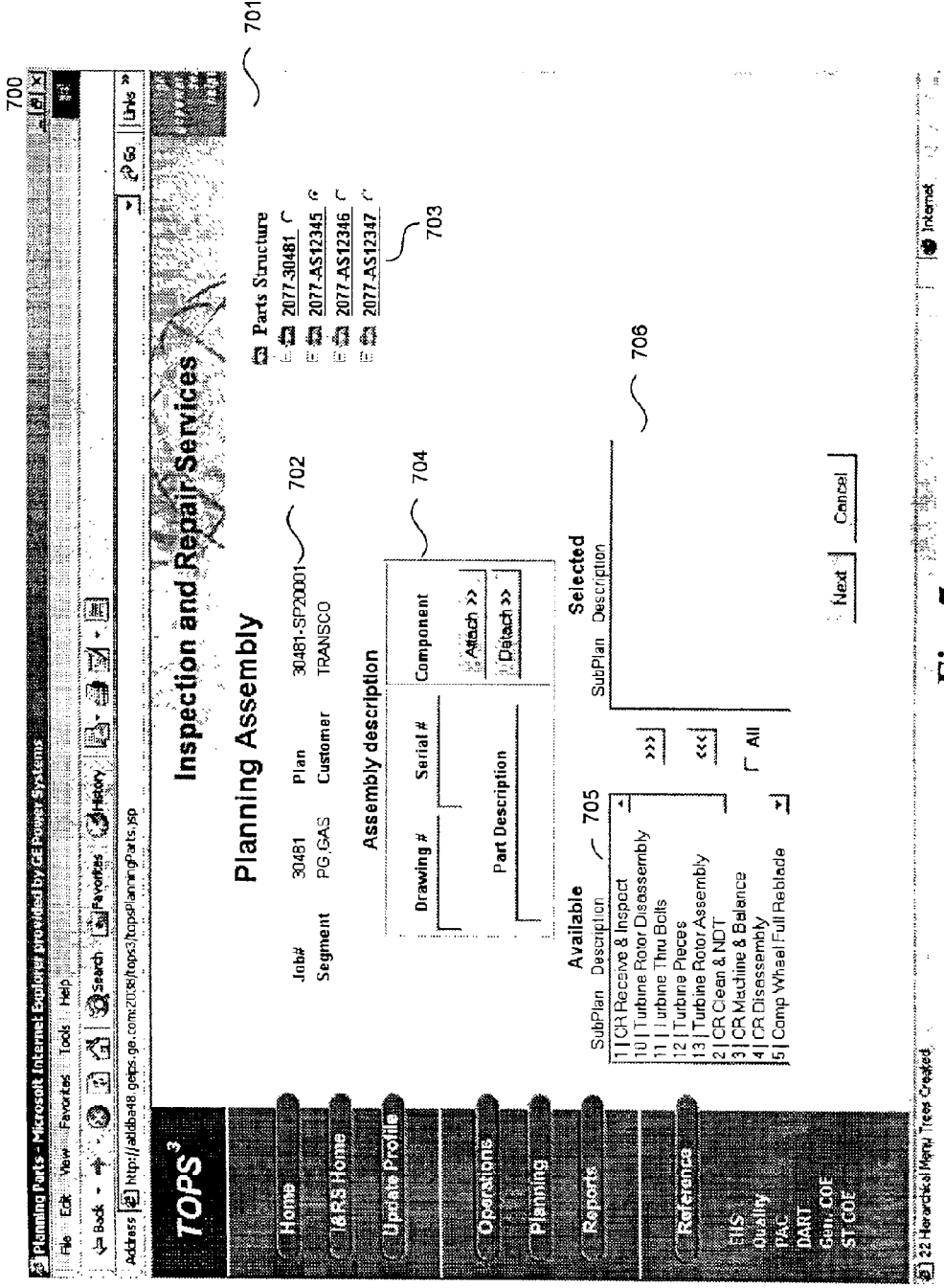
FIG. 7 illustrates a display page for creating a repair plan in one embodiment.
Figure 8:
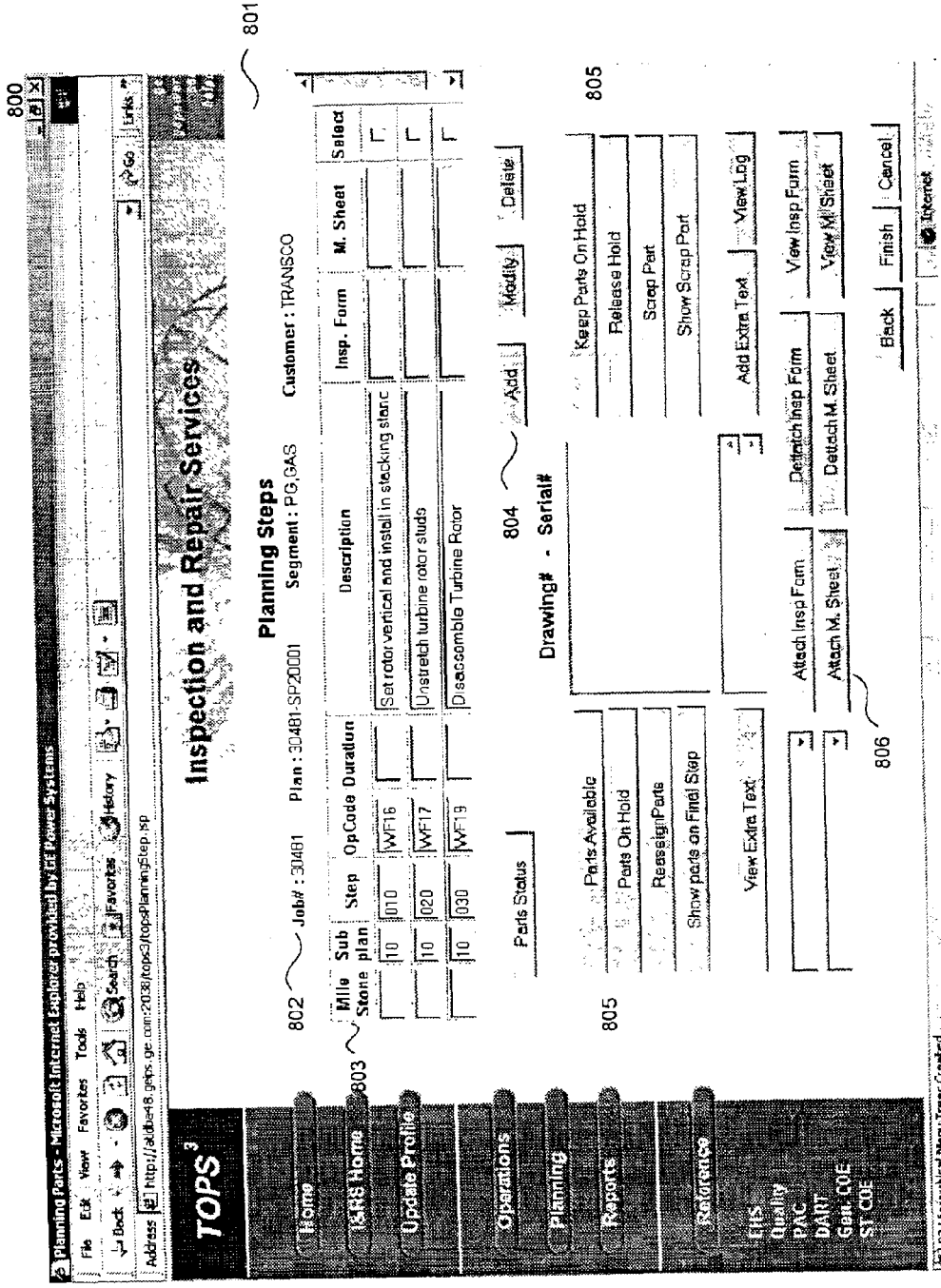
FIG. 8 illustrates a display page for specifying the processing for each step of a repair order plan in one embodiment.

FIGS. 6–8 illustrate display pages for assigning a repair plan to a repair order in one embodiment. FIG. 6 illustrates a display page for selecting a repair order that is to be assigned a repair plan in one embodiment. The display page 600 includes data entry area 601. The data entry area includes a repair order identification area 602 and an initial repair plan area 603. The repair order identification area provides a drop-down list of the repair orders that need to have a repair plan assigned. If the number of repair orders is large, then the user can use the search fields of the order identification area to search for a repair order. The user may specify a search criteria that includes a segment, a component, a customer, or a drawing number associated with a repair order. The user then selects the narrow search button to limit the repair orders listed in the drop-down list to those that match the search criteria. Once an order is selected, the user can select a standard repair plan or a previously built repair plan to be assigned to the order using the drop-down list of the initial repair plan area.

FIG. 7 illustrates a display page for creating a repair plan in one embodiment. The display page 700 includes a data entry area 701. The data entry area includes a repair order information area 702, a parts structure area 703, an assembly description area 704, an available steps area 705, and a selected steps area 706. The repair order information area contains information describing the repair order for which the repair plan is to be created. The parts structure area identifies the component and its subcomponents. The radio buttons to the right of the parts structure area indicate for which subcomponent the repair plan is currently being created. A user can select a component listed in the parts structure area to list its subcomponents. The assembly description area contains information describing the selected subcomponent. The available steps area identifies the steps of the initial repair plan. The user selects the arrow buttons to move the available steps to the selected steps area, and vice versa.

FIG. 8 illustrates a display page for specifying the processing for each step of a repair order plan in one embodiment. The display page 800 includes a data entry area 801. The data entry area includes a repair order information area 802, a steps description area 803, add, modify, and delete buttons 804, parts buttons 805, and attachment buttons 806. The repair order information area contains information describing the repair order for the repair plan being created. The steps description area contains an entry for each step of the repair plan. Each entry may identify a sub-plan, step, operation code, duration, description, inspection form, and method sheet. Each entry also contains a select checkbox. The add, modify, and delete buttons are used to add, modify, and delete the selected steps of the repair plan. The parts buttons are used to place parts on hold, determine part availability, reassign parts, scrap parts, and so on. The attachment buttons are used to attach and detach inspection forms and method sheets for selected steps of the repair plan.

Figure 9:
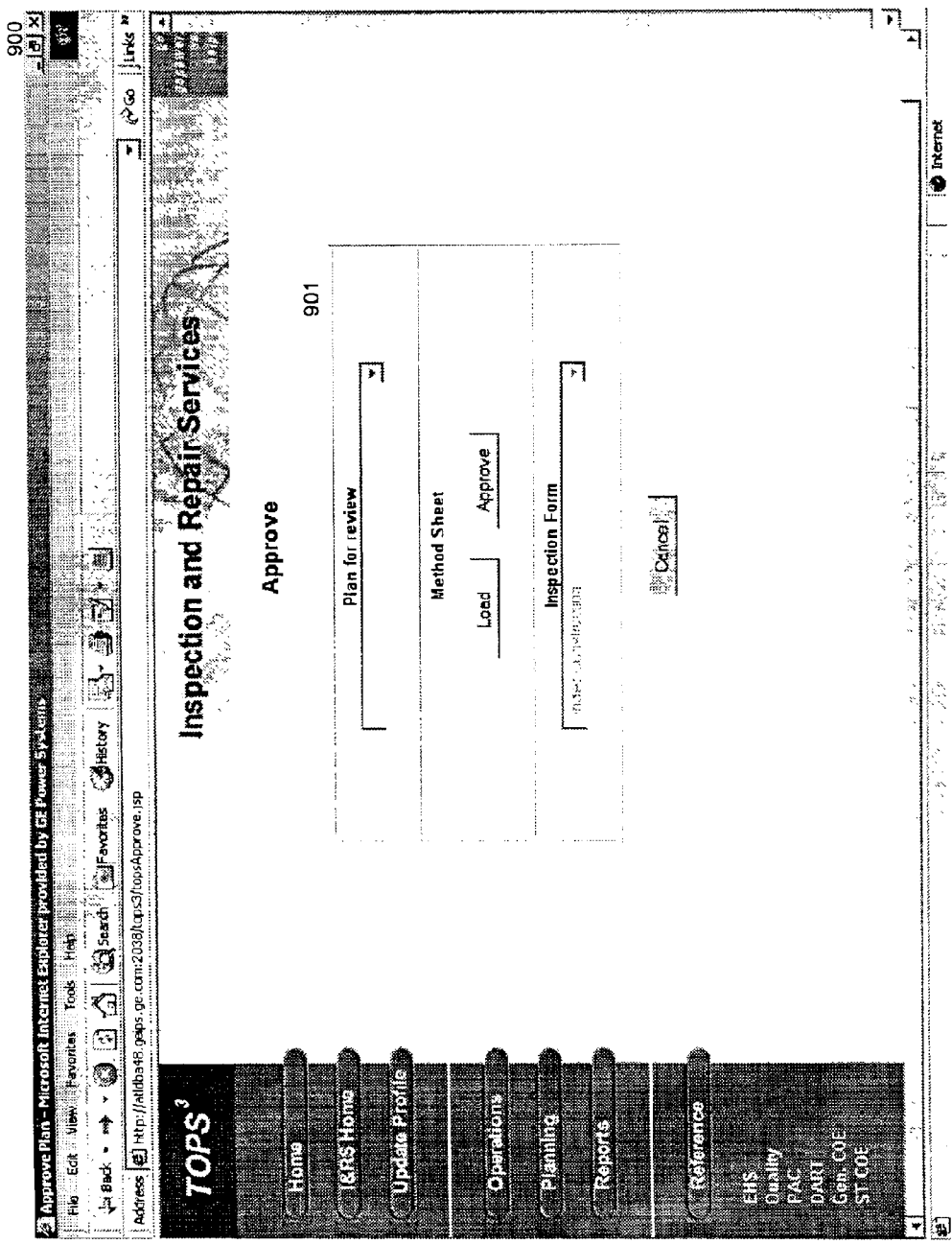
FIG. 9 illustrates a display page for selecting a repair plan to be approved in one embodiment.
Figure 10:
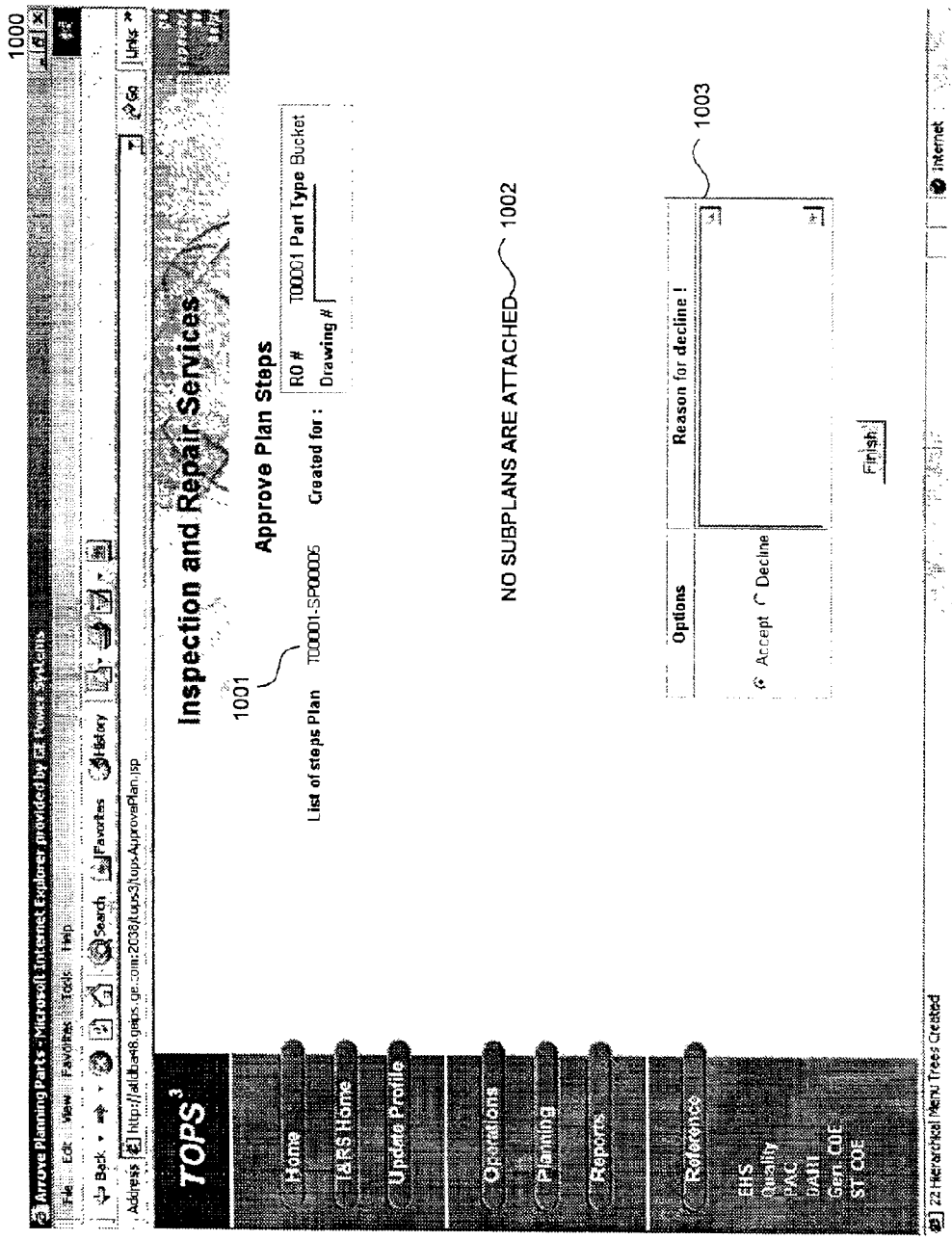
FIG. 10 illustrates a display page for approving the steps of the repair plan.
Figure 11:
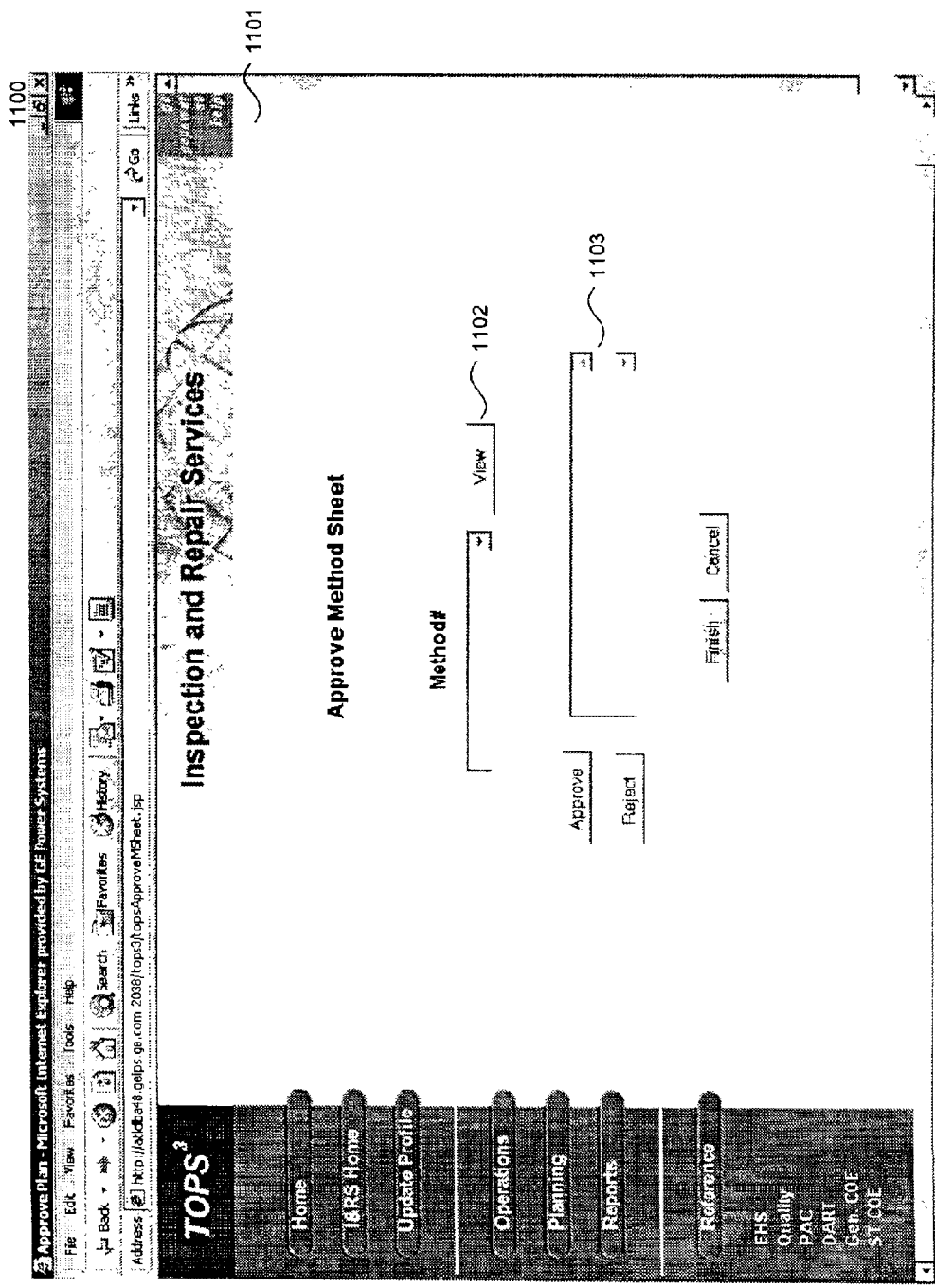
FIG. 11 illustrates a display page for approving a method sheet in one embodiment.

FIGS. 9–11 illustrate display pages for the approval of a repair plan in one embodiment. FIG. 9 illustrates a display page for selecting a repair plan to be approved in one embodiment. The display page 900 includes selection and method sheets area 901. A plan-for-review drop-down list identifies the repair plans that are awaiting approval. A user selects a repair plan from the drop-down list for approval. The user uses load and approve method sheet buttons to review and approve the method sheets for the selected repair plan. FIG. 10 illustrates a display page for approving the steps of the repair plan. The display page 1000 includes a plan identification area 1001, a steps area 1002, and an approval area 1003. A user can review the steps of a repair plan and either accept or decline the repair plan by using the radio buttons within the approval area. FIG. 11 illustrates a display page for approving a method sheet in one embodiment. The display page 1100 includes a data entry area 1101, a method sheet selection area 1102, and an approve area 1103. The user can select a method sheet using the method sheet selection area and view the selected method sheet. The user can then approve or reject the selected method sheet and specify the reasons for the approval or rejection.

Figure 12:
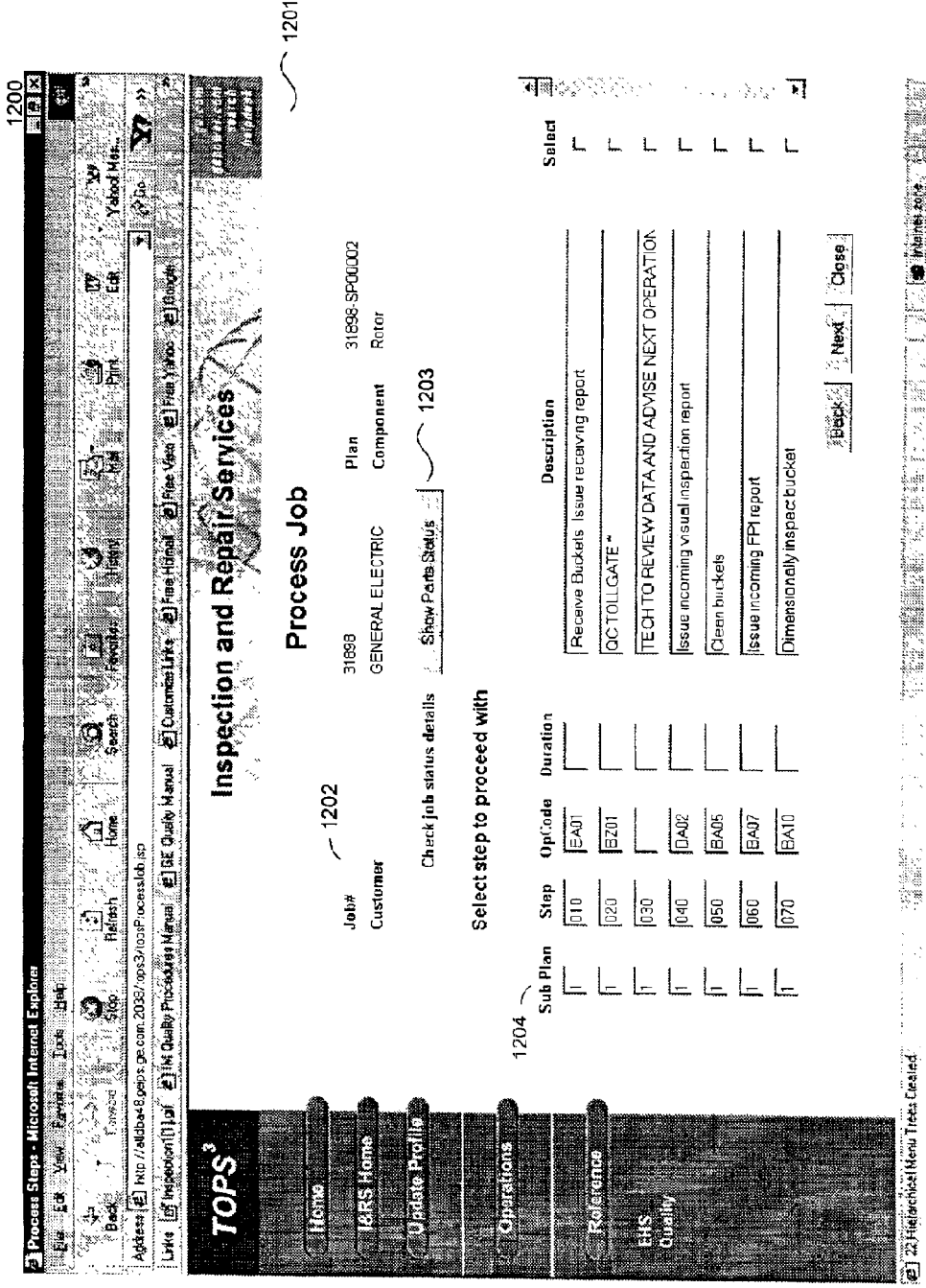
FIG. 12 illustrates a display page listing steps of a repair order in one embodiment.
Figure 13:
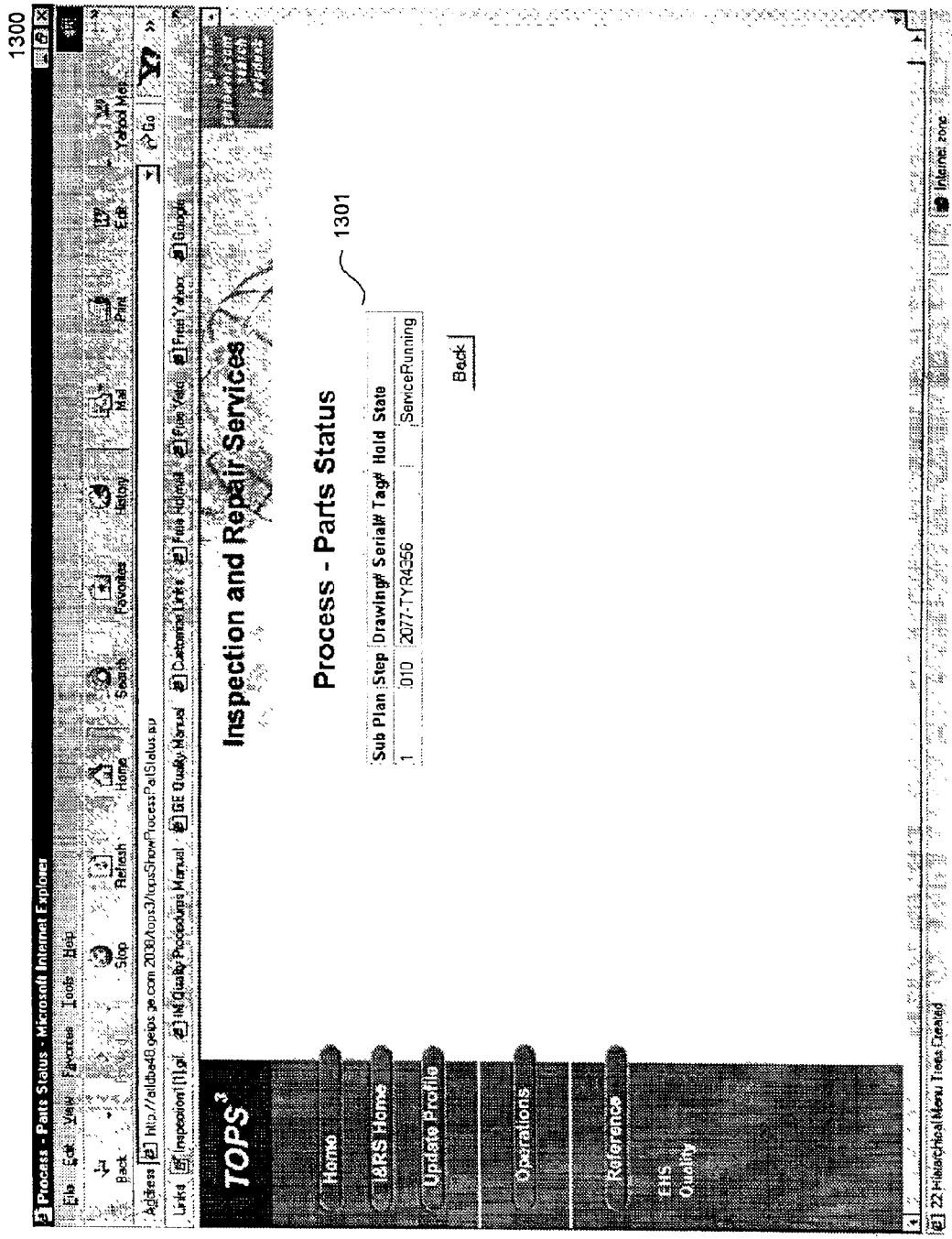
FIG. 13 illustrates a display page indicating parts status in one embodiment.

FIGS. 12–15 illustrate display pages for processing a repair order in one embodiment. FIG. 12 illustrates a display page listing steps of a repair order in one embodiment. A user may select a repair order to process by specifying a repair order number. The display page 1200 includes an information area 1201. The information area includes a repair plan identification area 1202, a show parts status button 1203, and a steps area 1204. The repair plan identification area identifies the repair order and repair plan. The show parts status button is used to review the status of the parts needed to complete the repair order. The steps area lists various steps of the repair plan. The select checkboxes are used to indicate the steps to be performed by the user. FIG. 13 illustrates a display page indicating parts status in one embodiment. The display page 1300 includes a parts status area 1301 that indicates the status of the part. In this example, the status indicates that the service is being performed on the part for sub-plan 1 and step 10.

Figure 14:
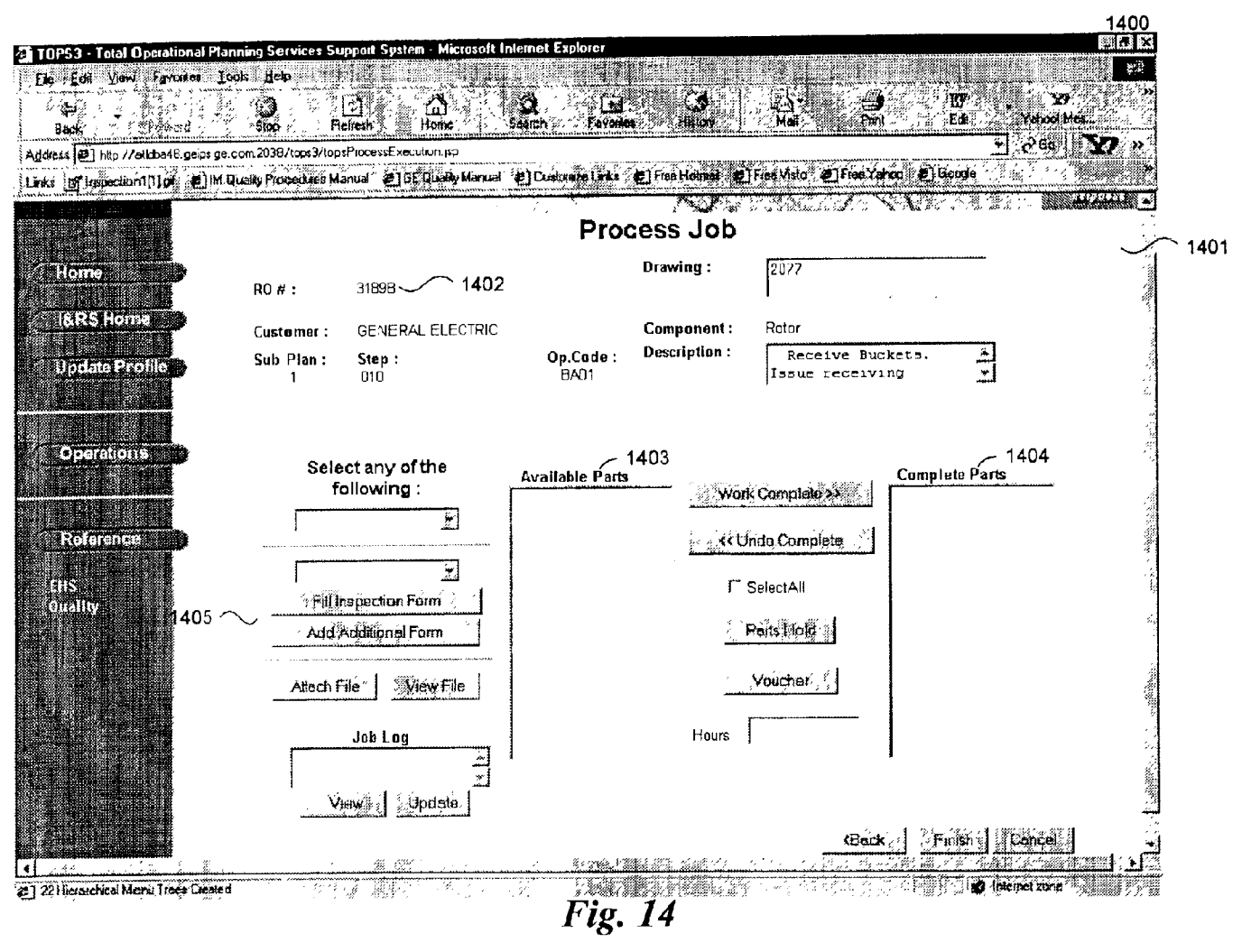
Figure 15:
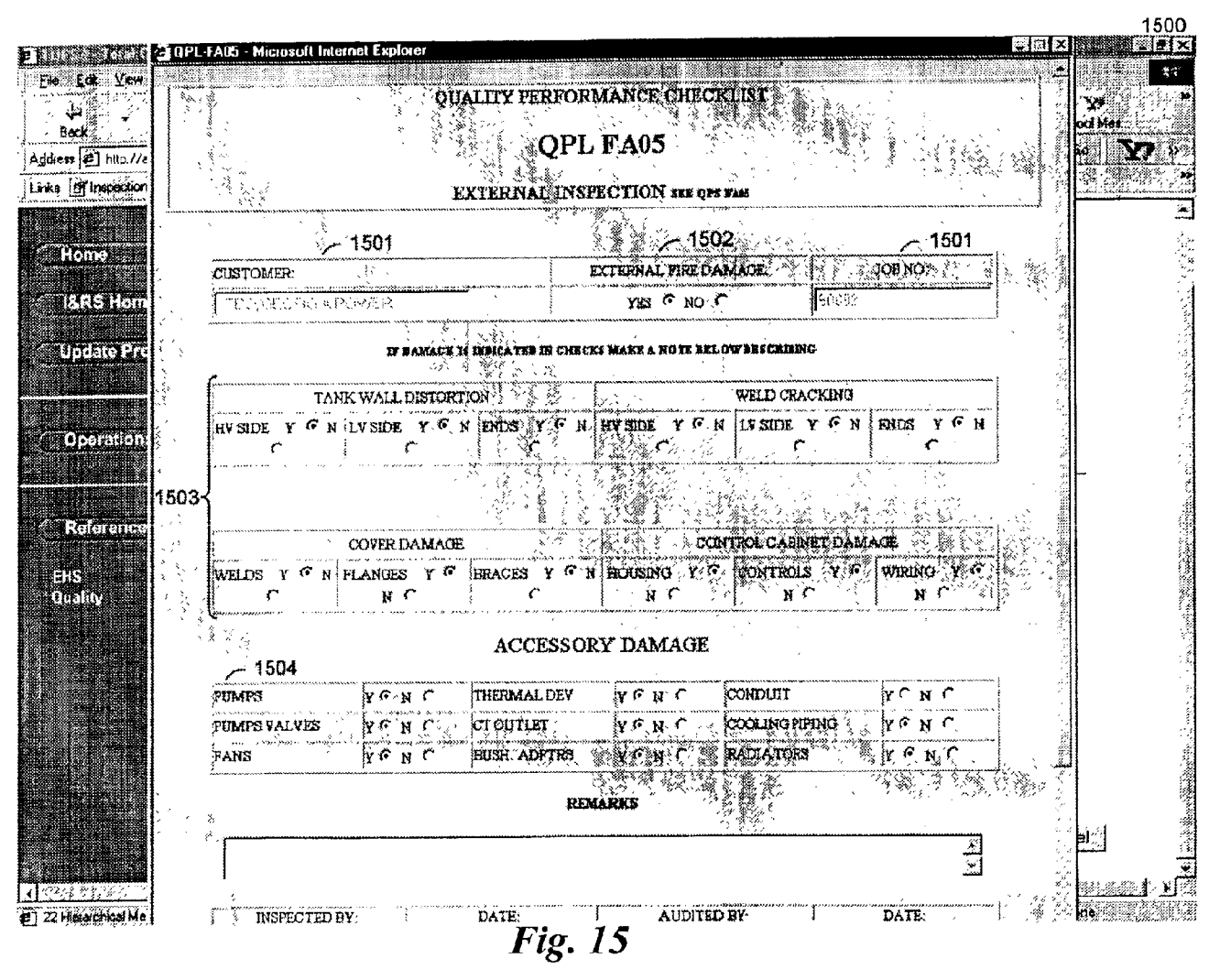

FIG. 14 illustrates a display page for recording the results of processing a step of a repair order in one embodiment. The display page 1400 includes a data entry area 1401. The data entry area includes a repair order identification area 1402, an available parts area 1403, a complete parts area 1404, and inspection buttons 1405. The repair order identification area identifies the repair order and step currently being processed. The available parts area lists the available parts related to the step being processed. The complete parts area lists those parts whose repair has been completed. The "work complete" and "undo complete" buttons are used to move parts into the complete or available statuses. The inspection buttons are used to fill out inspection forms. FIG. 15 illustrates a display page for an inspection form in one embodiment. The display page 1500 includes a repair order identification area 1501, a fire damage area 1502, a damage area 1503, and an accessory damage area 1504. The user selects the various radio buttons to indicate the damage to the components being inspected. One skilled in the art will appreciate that the inspection forms can be tailored to collect information relating to the various components.

Figure 16:
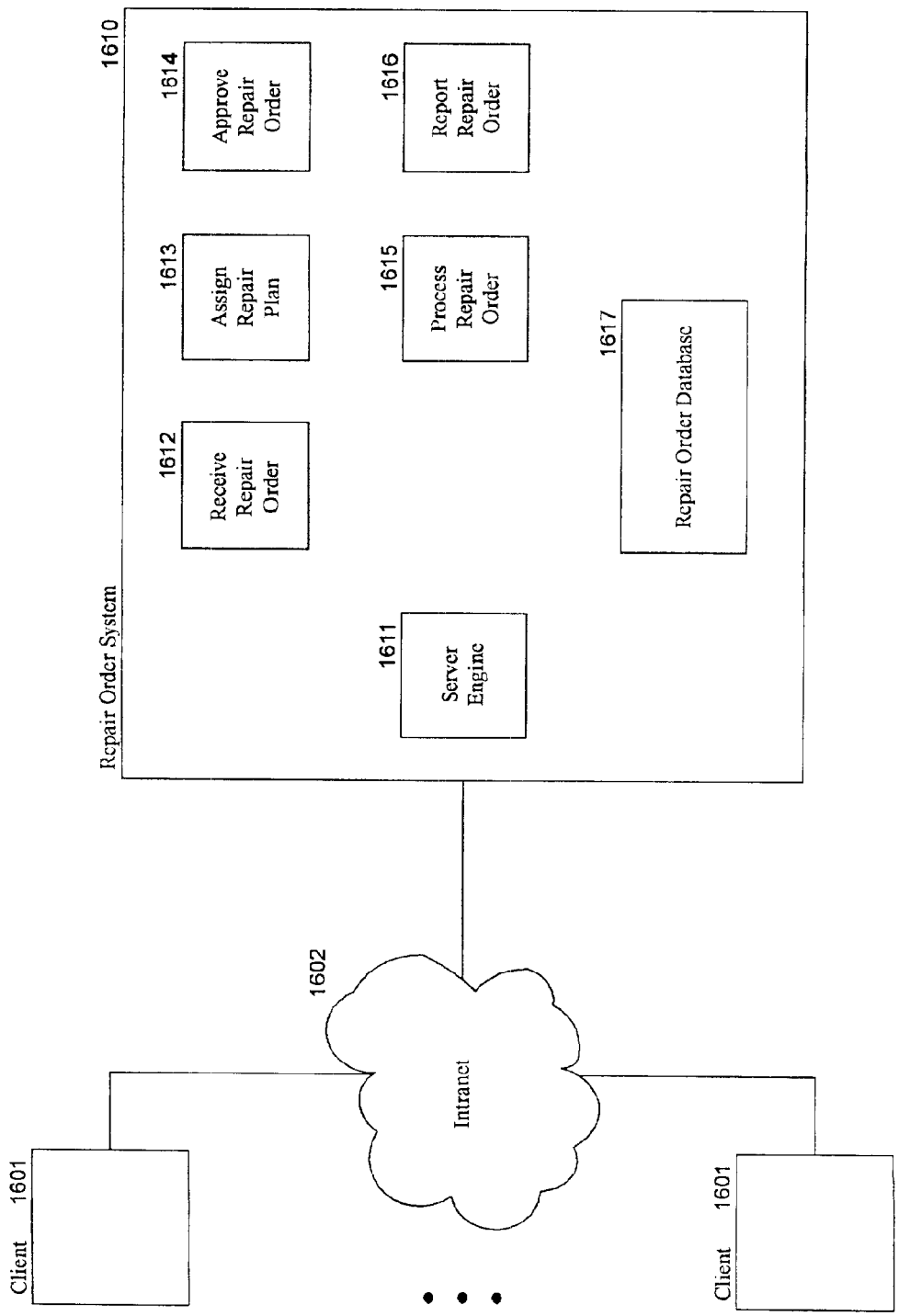
FIG. 16 is a block diagram illustrating modules of a repair tracking system in one embodiment.

FIG. 16 is a block diagram illustrating modules of a repair tracking system in one embodiment. The client computers 1601 are connected to the repair tracking system 1610 via a communications link 1602, such as an intranet or the Internet. The repair tracking system includes server engine 1611, a receive repair order module 1612, an assign repair plan module 1613, an approve repair plan module 1614, a process repair order module 1615, a report repair order module 1616, and a repair order database 1617. The server engine receives requests (e.g., HTTP requests) for services from client computers, invokes the appropriate module for performing the service, and transmits responses (e.g., HTTP responses) to the client computers. The receive repair order module allows a user to create a new repair order for a component received from a customer. The assign repair plan module allows a user to create and assign a repair plan for a repair order. The approve repair plan module allows a user to approve the repair plan for repair order. The process repair order module allows a user to identify the next step in the repair order that is to be performed and to record the completion of that step. The report repair order module is used to generate various reports related to the repair orders. The repair order database contains information describing the repair orders, the repair plans, and so on.

In one embodiment, the repair tracking system executes on a computer system that may include a central processing unit, memory, input devices (e.g., keyboard and pointing device), output devices (e.g., display devices), and storage devices (e.g., disk drives). The memory and storage devices are computer-readable media that may contain computer instructions that implement the repair tracking system and data structures of the repair tracking system. The repair tracking system may communicate with other computer systems via the Internet, a wide area network, local area network, point-to-point dial-up connections, or other communications links. The communication links are computer-readable media for transmitting data structures (e.g., messages) of the system.

Figure 17:
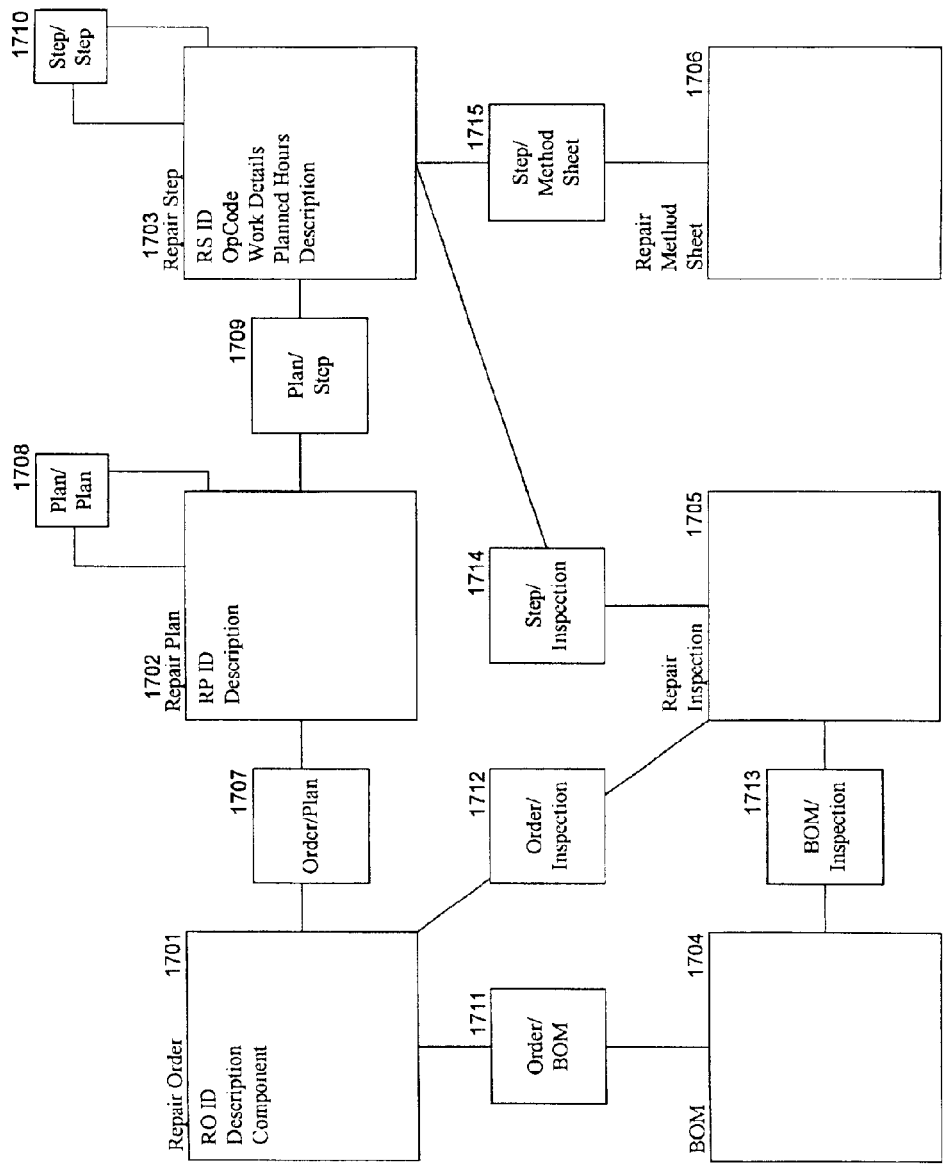
FIG. 17 is a block diagram illustrating the schema of the repair order database in one embodiment.

FIG. 17 is a block diagram illustrating the schema of the repair order database in one embodiment. The repair order database includes a repair order table 1701, a repair plan table 1702, a repair step table 1703, a bill of material table 1704, a repair inspection table 1705, and a repair method sheet table 1706. The repair order table contains an entry for each repair order. An entry includes the repair order identifier, a description of the repair order, an identification of the customer, and so on. The repair plan table contains an entry for each repair plan that has been defined. An entry includes a repair plan identifier, a description of the repair plan, and so on. The repair step table contains an entry for each repair step that has been defined. An entry includes a repair step identifier, an operations code, work detail information, a description, and so on. The bill of material table contains an entry for each component that defines the subcomponents of the component in an hierarchical manner. The repair inspection table contains an entry for each inspection form that identifies the inspection form and its content. The repair method sheet table contains an entry for each method sheet that has been defined.

The relationships between the tables 1701–1706 are identified by the various relationship tables 1707–1715. The order/plan relationship table 1707 identifies for each repair order the repair plans that have been assigned. Thus, the database supports multiple repair plans per repair order. One skilled in the art will appreciate that the user interface for the repair tracking system may, however, impose a limit of one repair plan per repair order. The plan/plan relationship table 1708 identifies a hierarchical relationship between repair plans. That is, one repair plan may comprise multiple repair plans. The plan/step relationship table 1709 identifies the repair steps that are in each repair plan. The step/step relationship table 1710 identifies the hierarchical relationship of repair steps. That is, a repair step may be made up of other repair steps. The order/bill of material relationship table 1711 identifies the components of each repair order. The order/inspection relationship table 1712 identifies the inspection forms associated with each repair order. The bill of material/inspection relationship table 1713 identifies the inspection forms associated with each component. The step/inspection relationship table 1714 identifies the inspection forms associated with each repair step. The step/method sheet relationship table 1715 identifies the method sheets associated with each repair step.

Figure 18:
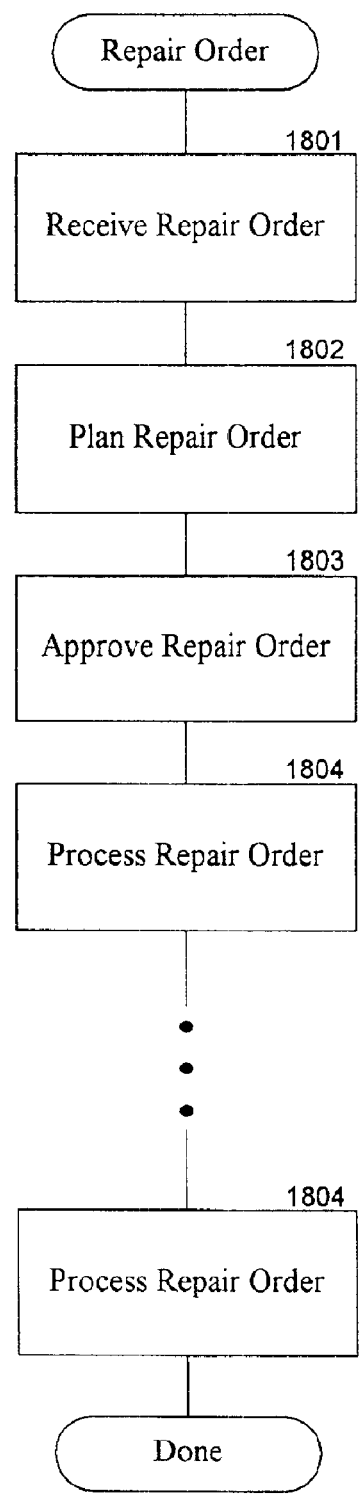
FIG. 18 is a flow diagram illustrating the overall processing of the repair tracking system in one embodiment.

FIG. 18 is a flow diagram illustrating the overall processing of the repair tracking system in one embodiment. In block 1801, the system receives repair order information from a user. In block 1802, the system coordinates the assigning of a repair plan to the repair order. In block 1803, the system coordinates the approval of the repair order with the assigned repair plan. In block 1804, the system coordinates the performing of each step in the repair order.

Figure 19:
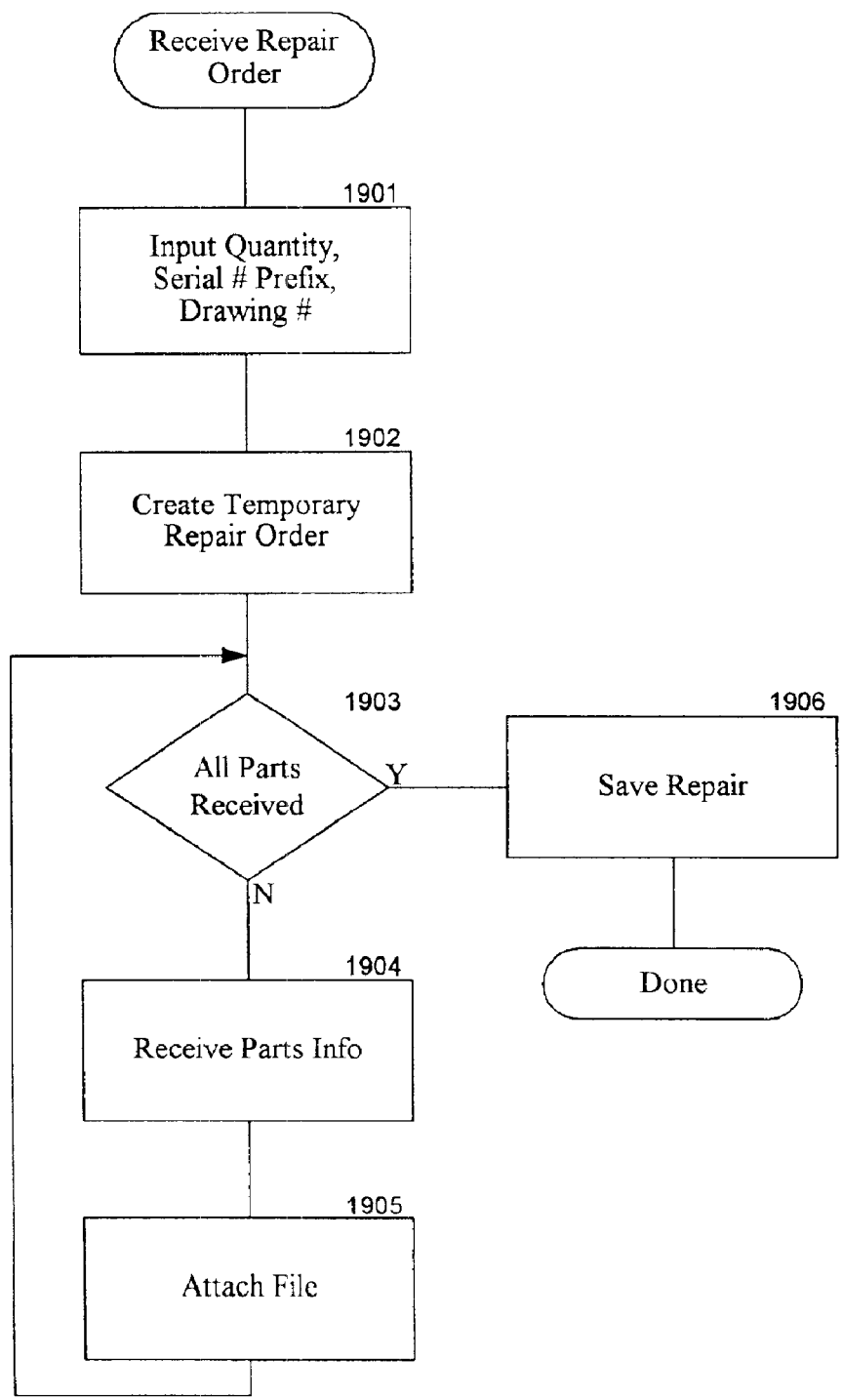
FIG. 19 is a flow diagram illustrating the processing of a receive new repair order module in one embodiment.

FIG. 19 is a flow diagram illustrating the processing of a receive new repair order module in one embodiment. In block 1901, the module inputs a quantity and, optionally, a serial number prefix and drawing number for a repair order. In block 1902, the module creates a temporary repair order. In blocks 1903–1905, the module loops coordinating the defining of the repair order. In decision block 1903, if all the parts for the repair order have been specified by the user, then the module continues at block 1906, else the module continues at block 1904. In block 1904, the module receives the part information from the user. In block 1905, the module coordinates the attaching of any files for the part. The module then loops to block 1903 to receive the next part information. In block 1906, the module saves the repair order information in the repair order database and then completes.

Figure 20:
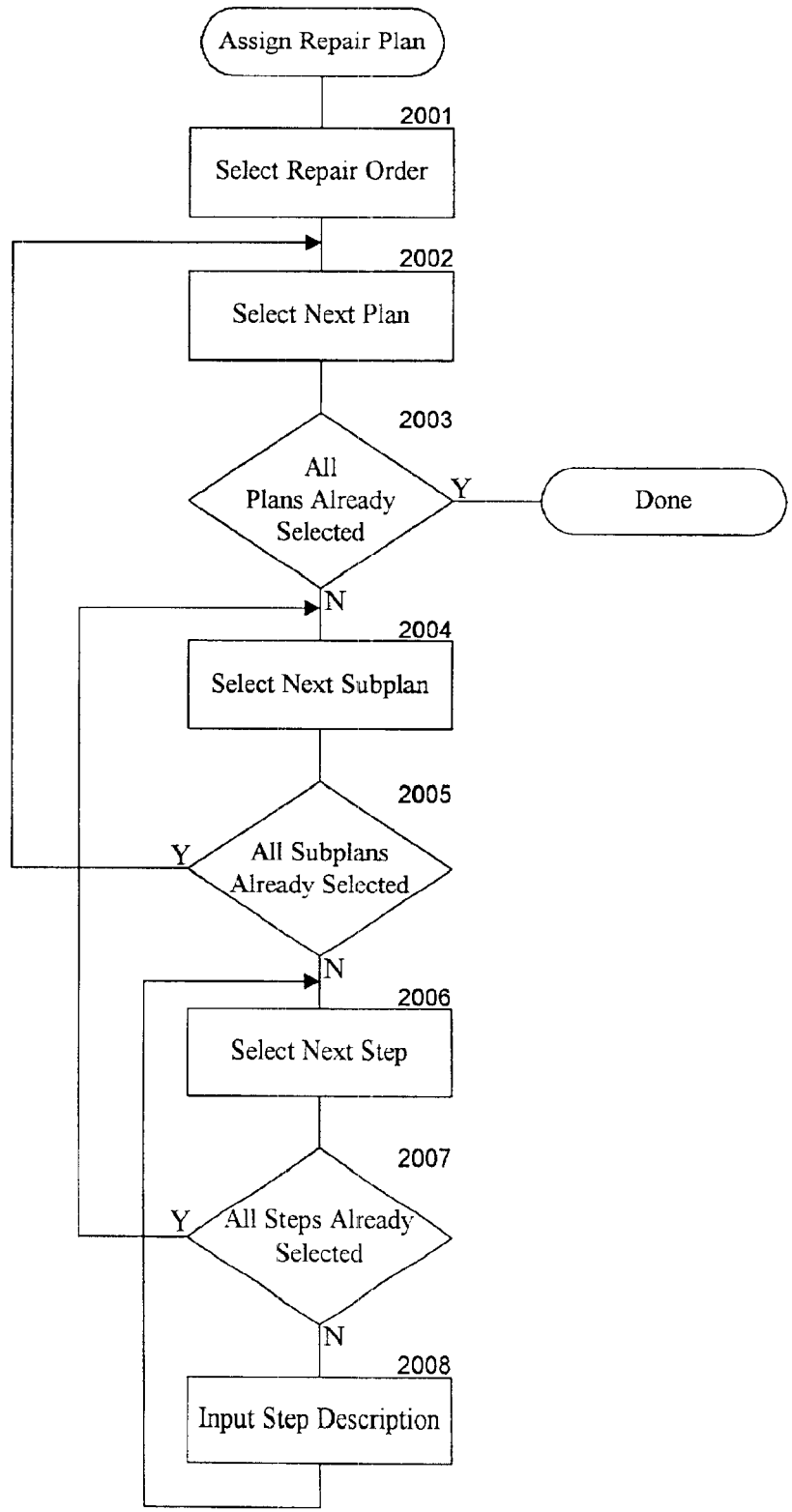
FIG. 20 is a flow diagram illustrating the processing of the assign repair plan module in one embodiment.

FIG. 20 is a flow diagram illustrating the processing of the assign repair plan module in one embodiment. In block 2001, the module selects a repair order based on information provided by the user. In blocks 2002–2008, the module loops allowing the user to define various plans and sub-plans and steps and sub-steps within the plans. In block 2002, the module selects a next plan identified by the user. In decision block 2003, if all the plans have already been selected, then the module completes, else the module continues at block 2004. In block 2004, the module selects a next sub-plan for the selected plan based on user input. In decision block 2005, if all the sub-plans have already been selected by the user, then the module loops to block 2002 to select a next plan, else the module continues at block 2006. In block 2006, the component selects a next step based on user input. In decision block 2007, if all the steps have already been selected by the user, then the module loops to block 2004 to select the next sub-plan, else the module continues at block 2008. In block 2008, the module inputs a step description from the user and loops to block 2006 to select the next step.

Figure 21:
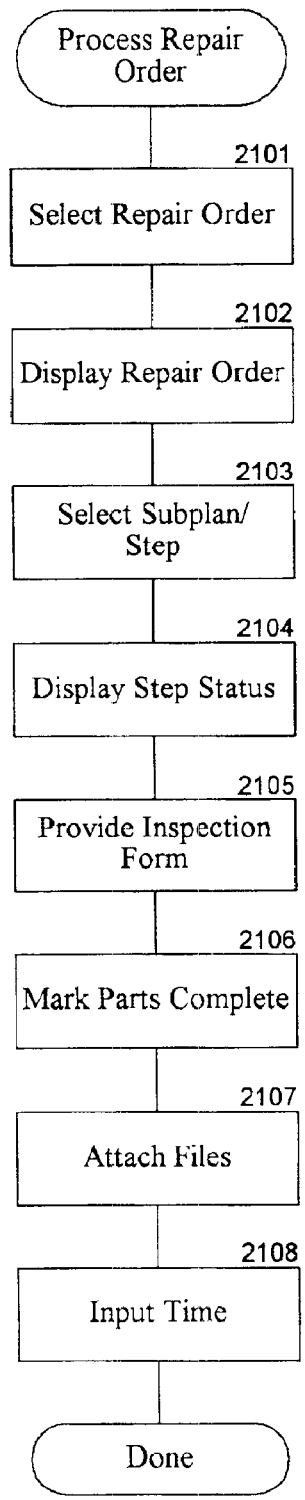
FIG. 21 is a flow diagram illustrating the process repair order module in one embodiment.

FIG. 21 is a flow diagram illustrating the process repair order module in one embodiment. In block 2101, the module selects a repair order based on user input. In block 2102, the module displays repair order information retrieved from the repair order database. In block 2103, the module selects a sub-plan and step based on user input. In block 2104, the module displays step status information. In block 2105, the module optionally provides an inspection form or method sheet as requested by the user. In block 2106, the module marks the step complete. In block 2107, the module attaches any files specified by the user to the repair order. In block 2108, the module records the processing time and then completes.

From the above description, it will be appreciated that although specific embodiments of the repair tracking system have been described for purposes of illustration, various modifications may be made without deviating from the scope of the invention. The invention is defined by the claims that follow.

What is claimed is:

1. A method in a computer system for tracking repair of a plurality of different types of components, the method comprising:

receiving a plurality of repair orders, each repair order indicating that a component is to be repaired;

assigning a repair plan to each repair order, a repair plan having one or more repair steps, each repair step indicating a service to be performed to repair the component indicated in the received repair order; and processing the received repair orders by, for steps of the assigned repair plan, receiving a selection of the repair order by a repair technician;

receiving a selection of a repair step of the repair plan for the selected repair order;

providing to the repair technician description of the service to be performed on the component at the selected repair step;

receiving an indication that the selected repair step has been completed;

storing information indicating progress of the processing of each repair step of each repair order; and using the stored information when designing components.

2. The method of claim 1 wherein a standard plan for repairing components of the type of the repair order is assigned to the repair order.

3. The method of claim 1 wherein a repair plan that is customized for the received repair order is assigned to the received repair order.

4. The method of claim 1 wherein a plan has an associated inspection form for collecting information relating to an inspection of the component.

5. The method of claim 1 including coordinating approval of the assigned repair plan.

6. The method of claim 1 wherein a component comprises one or more sub-components, each sub-component having its own repair plan.

7. The method of claim 1 wherein the provided description is a method sheet.

8. The method of claim 1 wherein a repair step includes multiple repair sub-steps.

9. The method of claim 1 wherein each repair order is associated with a customer and providing customers with access to the stored information for their repair orders.

10. The method of claim 1 wherein the service of the repair steps may be performed at different repair stations.

11. A computer system for tracking repair of a plurality of different types of components, comprising:

a receive repair order module that receives repair orders indicating components to be repaired;

an assign repair plan module that assigns a repair plan to each repair order, a repair plan having one or more repair steps indicating services to be performed to repair the components indicated in received repair orders;

a process repair order module that processes the received repair orders by receiving a selection of the repair order by a repair technician, receiving a selection of a repair step of the repair plan for the selected repair order, and receiving an indication that the selected repair step has been completed;

a database for storing information indicating progress of the processing of each repair step of each repair order; and for allowing use of the stored information when designing components.

12. The computer system of claim 11 wherein the assign repair plan module assigns to a repair order a standard plan for repairing components of the type of the repair order.

13. The computer system of claim 11 wherein the assign repair plan module assigns to a repair order a repair plan that is customized for the received repair order.

14. The computer system of claim 11 wherein a repair plan has an associated inspection form for collecting information relating to an inspection of a component.

15. The computer system of claim 11 including an approve repair order module that coordinates approval of the assigned repair plan.

16. The computer system of claim 11 wherein a component comprises one or more sub-components, each sub-component having its own repair plan.

17. The computer system of claim 11 wherein a repair step has an associated method sheet.

18. The computer system of claim 11 wherein a repair step includes multiple repair sub-steps.

19. The computer system of claim 11 wherein each repair order is associated with a customer and providing customers with access to the stored information for their repair orders.

20. The computer system of claim 11 wherein the service of the repair steps may be performed at different repair stations.

21. A method in a computer system for assigning repair plans to repair orders, the method comprising:

receiving a plurality of repair orders, each repair order having a component that is to be repaired;

selecting repair pians to be assigned to the repair orders, a repair plan having one or more repair steps, each repair step indicating processing to be performed to repair the component of the repair order;

customizing the selected repair plan for the repair order;

receiving approval of the customized repair plan for the repair order;

storing information indicating progress of the processing of each repair step of an associated repair order; and using the stored information when designing components.

22. The method of claim 21 including processing the received repair orders by receiving a selection of the repair order by a repair technician;

receiving a selection of a repair step of the repair plan for the selected repair order;

providing to the repair technician a description of the processing to be performed to repair the component at the selected repair step; and receiving an indication that the processing of the selected repair step has been completed.

23. The method of claim 21 wherein a standard repair plan for repairing components of the type of the repair order is selected.

24. The method of claim 21 wherein a repair plan has an associated inspection form for collecting information relating to an inspection of the component.

25. The method of claim 21 wherein a component comprises one or more sub-components, each sub-component having its own repair plan.

26. The method of claim 21 wherein a repair step includes multiple repair sub-steps.

27. The method of claim 21 wherein each repair order is associated with a customer and providing customers with access to information relating to their repair orders.

28. The method of claim 21 wherein the processing of repair steps may be performed at different workstations.

29. A computer-readable medium for controlling a computer system to track repair of components, by a method comprising:

receiving a repair order indicating that a component is to be repaired;

assigning a repair plan to the received repair order, the repair plan having one or more repair steps, each repair step indicating processing to be performed to repair the component indicated in the received repair order; and processing the received repair order by, receiving a selection of the repair order;

receiving a selection of a repair step of the repair plan for the selected repair order;

receiving an indication that the selected repair step has been completed;

storing information indicating progress of the processing of each repair step of an associated repair order; and using the stored information when designing components.

30. The computer-readable medium of claim 29 wherein a standard repair plan for repairing components is assigned to the repair order.

31. The computer-readable medium of claim 29 wherein a repair plan that is customized for the received repair order is assigned to the received repair order.

32. The computer-readable medium of claim 29 wherein a repair plan has an associated inspection form for collecting information relating to an inspection of the component.

33. The computer-readable medium of claim 29 including coordinating approval of the assigned repair plan.

34. The computer-readable medium of claim 29 wherein a component comprises one or more sub-components, each sub-component having its own repair plan.

35. The computer-readable medium of claim 29 wherein a repair order is associated with a customer and providing customers with access to the stored information for their repair orders.

36. A computer system for tracking repair of components, comprising:

means for receiving a repair order;

means for assigning a repair plan to a repair order; and means for processing the received repair order by
receiving a selection of a repair step;
providing a description of processing to be performed at the selected repair step;
receiving an indication that the processing at the selected repair step is complete; and
storing information indicating progress of the processing of each repair step of a repair order for use when designing components.

\* \* \* \* \*